United States Patent [19]

Guimbal

[11] Patent Number: 5,190,243
[45] Date of Patent: Mar. 2, 1993

[54] DEVICE FOR THE ADJUSTMENT OF THE MANEUVER FORCES OF MOVABLE MEMBERS OF AN AIRCRAFT

[75] Inventor: Bruno Guimbal, Les Milles, France

[73] Assignee: Aerospatiale Societe Nationale Industrielle, Paris, France

[21] Appl. No.: 905,458

[22] Filed: Jun. 29, 1992

[30] Foreign Application Priority Data

Jul. 3, 1991 [FR] France .................... 91 08313

[51] Int. Cl.$^5$ ............................................ B64C 27/52
[52] U.S. Cl. ................................ 244/17.25; 244/75 R; 244/234; 244/220; 74/491; 416/102; 416/147
[58] Field of Search ............... 244/17.25, 17.11, 17.13, 244/75 R, 220, 232, 234; 74/531, 491; 416/98, 99, 102, 147, 148, 149, 168 R

[56] References Cited

U.S. PATENT DOCUMENTS

| | | | |
|---|---|---|---|
| 2,856,788 | 10/1958 | Jovanovich | 74/469 |
| 3,008,524 | 11/1961 | Kaplan | 416/168 |
| 3,228,478 | 1/1966 | Edenborough | 244/234 |
| 3,385,537 | 5/1968 | Lichten et al. | 416/147 |
| 3,785,596 | 1/1974 | Chinchester | 244/220 |
| 3,866,857 | 2/1975 | Ciastala | 284/17.25 |
| 4,491,032 | 1/1985 | Saito et al. | 74/473 R |
| 4,770,375 | 9/1988 | Lappos | 244/220 |

FOREIGN PATENT DOCUMENTS

| | | |
|---|---|---|
| 546276 | 11/1922 | France . |
| 764635 | 5/1934 | France . |
| 910689 | 6/1946 | France . |

OTHER PUBLICATIONS

French Search Report—Institut National Propriete Industrielle—Mar. 20, 1992.

Primary Examiner—Joseph F. Peters, Jr.
Assistant Examiner—Christopher P. Ellis
Attorney, Agent, or Firm—Fisher, Christen & Sabol

[57] ABSTRACT

A device for the adjustment of the maneuver forces of movable members of an aircraft. The device includes:

a pivoting control column (6);

a shaft (7) which is articulated to the column and which is able to pivot around its axis following an angular displacement of the column (6) in a first plane;

a first link (8) which is provided between the shaft and at least one first movable member (9), and which gives rise to the displacement of the at least one first movable member;

a connecting rod (10) which is articulated to the column and which is able to be displaced in translation parallel to its longitudinal axis following an angular displacement of the column (6) in a second plane;

a second link (11) which is provided between the connecting rod and at least one second movable member (12), and which gives rise to the displacement of the at least one second movable member; and friction unit (13) in order to apply the correct forces for the angular displacements of the column in the two planes, and which is arranged between the first and second links (8, 11). The device can be applied especially to the control of the cyclic plate of the rotor of a helicopter.

11 Claims, 2 Drawing Sheets

DEVICE FOR THE ADJUSTMENT OF THE MANEUVER FORCES OF MOVABLE MEMBERS OF AN AIRCRAFT

BACKGROUND OF THE INVENTION

1. Field of the Invention

The present invention relates to a single device for the adjustment of the maneuver forces of movable members of an aircraft via a control part acting on two independent, linear control links or chains.

Although not exclusively, the device in accordance with the invention is more particularly intended for the control of the cyclic plate of a helicopter rotor. In this case, the movable members then correspond to connecting control rods, jacks or similar, which are connected to the cyclic plate and which make it possible to obtain, in a known way and as a function of the displacements imposed by the pilot on the device, by acting on a column known as a cyclic column, the inclination of the cyclic plate around two perpendicular axes, which inclination of the cyclic plate then controls the tilting of the attitude of the rotor following the angular displacement of the column by the pilot.

However, the device could also be applied to the control of aerodynamic surfaces of an aircraft. In this case, the movable members correspond, for example, to the elevators and warping surfaces pivoting around transverse axes, which are controlled in a co-ordinated way by a control column or a "horn steering wheel" arranged at the upper end of a lever which moves longitudinally.

2. Prior Art

Numerous devices for the control of movable members of an aircraft are already known, such as that taught by French Patent FR-764 635 and applied to the control of the inclination of a rotor.

Generally, the known devices comprise a pivoting control column to which are articulated a shaft and a connecting rod. Under the action of an angular displacement of the column in a first plane, the shaft may pivot around its axis and give rise, by the intermediary of a first link, to the displacement of at least a first movable member. By analogy, under the action of an angular displacement of the column in a second plane, the connecting rod can be displaced in translation parallel to its longitudinal axis and can give rise, by the intermediary of a second link, to the displacement of at least a second movable member.

Hence, in the preferred application of the device to the control of the cyclic plate of the rotor of a helicopter, it is known that the displacement of the first member articulated to the cyclic plate gives rise to the pivoting of said plate around an axis chosen such that, having regard to the gyroscopic precession effect, this pivoting of the cyclic plate brings about a forward or a rearward inclination of the rotor disk, according to the direction of the angular displacement of the cyclic column in the first plane defined by the roll axis and the yaw axis of said helicopter. As for the lateral inclination of the rotor disk parallel to the roll axis of the helicopter, it is obtained by the opposite displacement of two movable members, connected to the plate and arranged respectively symmetrically, diametrically opposing, on either side of the axis which corresponds to the longitudinal tilting of the rotor disk. The angular displacement of the cyclic column in the second plane, defined by the pitch and yaw axes, then brings about the tilting of the rotor to the right or to the left according to the direction of the angular displacement of the column. These angular displacements of the column forwards or rearwards and to the right or to the left may be combined in such a way as to permit all the possible tiltings of the rotor according to the flight conditions demanded of the helicopter.

In addition, these control devices are also provided with friction means which, on the one hand, permit the pilot to apply the correct force during angular displacements of the cyclic column, and, on the other hand, make it possible to provide an adjustable braking of the angular displacements of the column under the forces originating from the cyclic plate, in particular in order to filter out the dynamic forces reaching the pilot, thereby improving the comfort and precision of piloting.

In a first embodiment, such as described in Patent FR-764 635 and used, for example, on numerous light helicopters, the friction means comprise two independent mechanisms with an adjustable knurled wheel interacting with a slide, the clamping of the knurled wheel against the slide determining the friction between these latter desired by the pilot. One of the two mechanisms is provided for the angular displacement of the column pivoting in the first plane, while the other mechanism is provided for the angular displacement of the column pivoting in the second plane. Although this first embodiment of the friction means is mechanically simple and offers a possibility of independent adjustments between the two mechanisms, on the other hand, it entails numerous drawbacks. First of all, the pilot is constrained to adjust the two knurled wheels in order to adapt the friction to his wishes. Moreover, these friction means lead to uncomfortable and imprecise piloting. In fact, the force to be overcome for any displacement of the cyclic column combining an angular displacement in the two planes (that is to say at any instant) is equal to the sum of the longitudinal force and of the lateral force to be provided. Moreover, the direction of this combined force is never aligned with that of the movement, which, on top of the unergonomic character of the movement supplied by the pilot, is translated, on helicopters equipped with these friction means, into the impossibility of performing accurate curved trajectories which are then carried out in a "jerky" fashion, by following, as well as possible, said curved trajectories to be executed.

In a second embodiment, the friction means of the control devices use a hemispherical ball joint at the base of the cyclic column, serving for the pivoting of the column, in order to obtain the desired friction according to the displacement of the column. In order to do this, the ball joint comprises a fixed friction dish solidly attached to the floor and traversed by the column, and a friction dish linked to the column and applied against the fixed dish. A knurled knob, surrounding the column, allows adjustment of the friction between the two dishes.

Hence, by virtue of these ball joint friction means, the adjustment of the friction of the column is obtained by a single knob, and the force to be delivered by the pilot is then tangential to the movement imposed by the pilot, removing the abovementioned drawbacks.

Nevertheless, these ball joint friction means cause other drawbacks to appear. First of all, it turns out that embodiment is mechanically complicated and tricky.

Furthermore, by reason of the axial passage of the column in the hemispherical dishes, the friction is not symmetric during any displacement whatever of the column. Moreover, as the ball joint is situated in the vicinity of the floor of the helicopter, it rapidly gets dirty and the adjustment knob of the friction means, which is accessible to the pilot, then becomes practically inaccessible for the co-pilot. It is then necessary to install another on the lower part of the co-pilot's column, but then the simultaneous adjustment of the two devices by the pilot and by the co-pilot is difficult. Furthermore, the force to be supplied by the pilot for a longitudinal displacement of the column (forwards or rearwards) is the same as that which it has to deliver for a lateral displacement (to the right or to the left), which is unergonomic. In fact, it is easier for a pilot to exert a higher longitudinal force forwards or rearwards than a lateral force to the left or the right.

BROAD DESCRIPTION OF THE INVENTION

The object of the present invention is to remedy the drawbacks inherent in the various embodiments of the friction means used in present-day control devices.

To this end is described the device for the adjustment of the maneuver forces of movable members of an aircraft, of the type which comprise:
at least one pivoting control column;
a shaft articulated to the column and able to pivot around its axis under the action of an angular displacement of the column in a first plane;
a first link provided between the shaft and at least one first movable member, giving rise to the displacement of the latter;
a connecting rod articulated to the column and able to be displaced in translation parallel to its longitudinal axis under the action of an angular displacement of the column in a second plane;
a second link provided between the connecting rod and at least one second movable member, giving rise to the displacement of the latter; and
friction means in order to apply the correct angular displacements to the column in the two planes and provide adjustable braking of the angular displacements of the column under the forces coming from the first and second movable members, is noteworthy. It according to the invention, that said friction means are arranged between the first and second links and comprise at least two friction elements, associated respectively with the first and second links, and clamping means adjustable by a single control to apply the two friction elements against one another.

Hence, by virtue of the invention, the friction means are advantageously and solely provided between the first and second links which have a common point by the intermediary of the friction elements. A simple and inexpensive structural embodiment of the control device results therefrom, as well as single and easy adjustment of the friction between the two elements by acting, for this purpose, on the clamping means via a single control. The device according to the invention is therefore free of the drawbacks linked to the prior friction means.

In the application of the device to the control of the cyclic plate of a helicopter, the pilot then directly adjusts the friction of the column, both for angular displacements in the first plane and in the second plane, by actuating the clamping means, which generate angular displacements generate, via the respective members, and the pivoting of the cyclic plate around the two perpendicular axes. The angular displacement of the column in the first plane then invokes the translation friction of one of the elements on the other, while the displacement of the column in the second, perpendicular, plane invokes the rotational friction of the other of the elements.

Preferably, the friction elements associated respectively with the first and second links are close to the shaft and to the connecting rod to which the pivoting column is articulated. Hence, the clamping means of the friction means are accessible easily to the pilot, since they are then in proximity to the column.

In the dual-control case, the clamping means are preferably situated between the pilot and the co-pilot substantially in the axis of symmetry of the helicopter in order to be able to be handled by one or the other as required.

More particularly, one of the friction elements is provided with a friction fitting while the other friction element is then coated with a material which has a high surface hardness; the clamping means allow the adjustment of the pressure between the fitting and the material. In this case, the friction fitting can be produced in polytetrafluoroethylene and can exhibit the shape of a disk applied to the element. Material coating the corresponding friction element may itself be produced in a surface-hardened metal material, for example in light alloy with chrome-based anode oxidation. This choice of coating and of fitting for the friction elements provides very comfortable piloting and nearly no wear.

In one preferred embodiment of the friction means, one of the friction elements exhibits the shape of a plane part sliding in a clip-shaped part defining the other friction element. In this case, the opposed faces of the plane part slide respectively on the coaxial friction fittings in the shape of a disk, fixed on the inner faces of the clip-shaped part and rubbing on the corresponding faces of the plane part. Hence the simplicity and the embodiment symmetry of the friction surfaces is noted, as well as the constant pressure exerted by them under the action of the clamping means. The latter can comprise a threaded stem, passing perpendicularly through the friction elements associated with the first and second links, and a clamping knob mounted on the stem which allows the adjustment of the friction between the elements.

According to another characteristic of the device, motor means may be coupled to the clamping means, permitting the pilot or the co-pilot to adjust the pressure between the two elements via a single control, for example, placed directly on their cyclic column.

Furthermore, it is known that control devices, especially for the cyclic plate of helicopters, are generally of the type in which with respect to the roll 0x, pitch 0y and yaw 0z axes:
the column can pivot, around a pivot center, in a first longitudinal plane x0z and in a second lateral plane y0z;
rotating shaft is arranged along the axis 0y;
the first link comprises a bar articulated onto the rotating shaft parallel to the latter and able, under the action of an angular displacement of the column in first plane, to be displaced longitudinally; and
the second link comprises a swing bar articulated to the connecting rod and able, under the action of the angular displacement of the column in said second plane, to pivot in its plane around an axis z—z which is parallel to the axis Oz.

In this case, a slide is provided on the first link between the shaft and the bar and the friction elements correspond, respectively to the slide and the swing bar of the first and second links, the clamping means pass perpendicularly along the axis z—z through the slide and the swing bar while pressing them against one another.

Hence, parts belonging to the first and second links are advantageously used as friction elements, More particularly, the stem of the clamping means is engaged, on the one hand, in a piercing provided in the swing bar and, on the other hand, in an oblong hole provided longitudinally in the slide. Consequently, an angular displacement of the column in the first plane is translated, by the intermediary of the rotating shaft, into a longitudinal displacement of the slide and, hence, of the first link, by virtue of the presence of the oblong hole. An angular displacement of the column in the second plane is then translated, by the intermediary of the connecting rod, into a pivoting of the swing bar mounted free to rotate around the stem of the clamping means and, hence, a displacement of the second link.

In a preferred embodiment, the swing bar exhibits a clip shape, between the opposed faces of which is arranged slide, and it comprises, in this embodiment, two friction disks fixed respectively to the opposed faces of the swing bar and applied, on the basis of the adjustment of the clamping means, against the corresponding faces of the slide.

Moreover, clamping means, associating the slide and the swing bar with one another, are mounted slidably along the axis z—z in bearings linked to the structure of said aircraft, the assembly is formed by the friction means and constituted by the clamping means, the swing bar and the slide are capable of sliding axially between a high position, in which the column is in a neutral position at least in the first plane x0z, and a low position in which the angular displacement of the column in the first plane is maximum.

This arrangement is made necessary due to the fact that the articulation of the slide to the shaft is offset parallel to the latter, as for a connecting rod-crank handle mechanism. In the neutral position of the column, in the first plane x0z, the articulation is at a high point of a circular trajectory having its center at the axis of the shaft, and hence it may, during rotation of the shaft, follow the trajectory by being lowered with respect to the high point in such a way that the assembly is driven towards a low position.

The figures of the attached drawing will make it easier to understand how the invention can be produced. In these figures, identical references designate similar elements.

BRIEF DESCRIPTION OF THE INVENTION

DETAILED DESCRIPTION OF THE INVENTION

Figure 1:
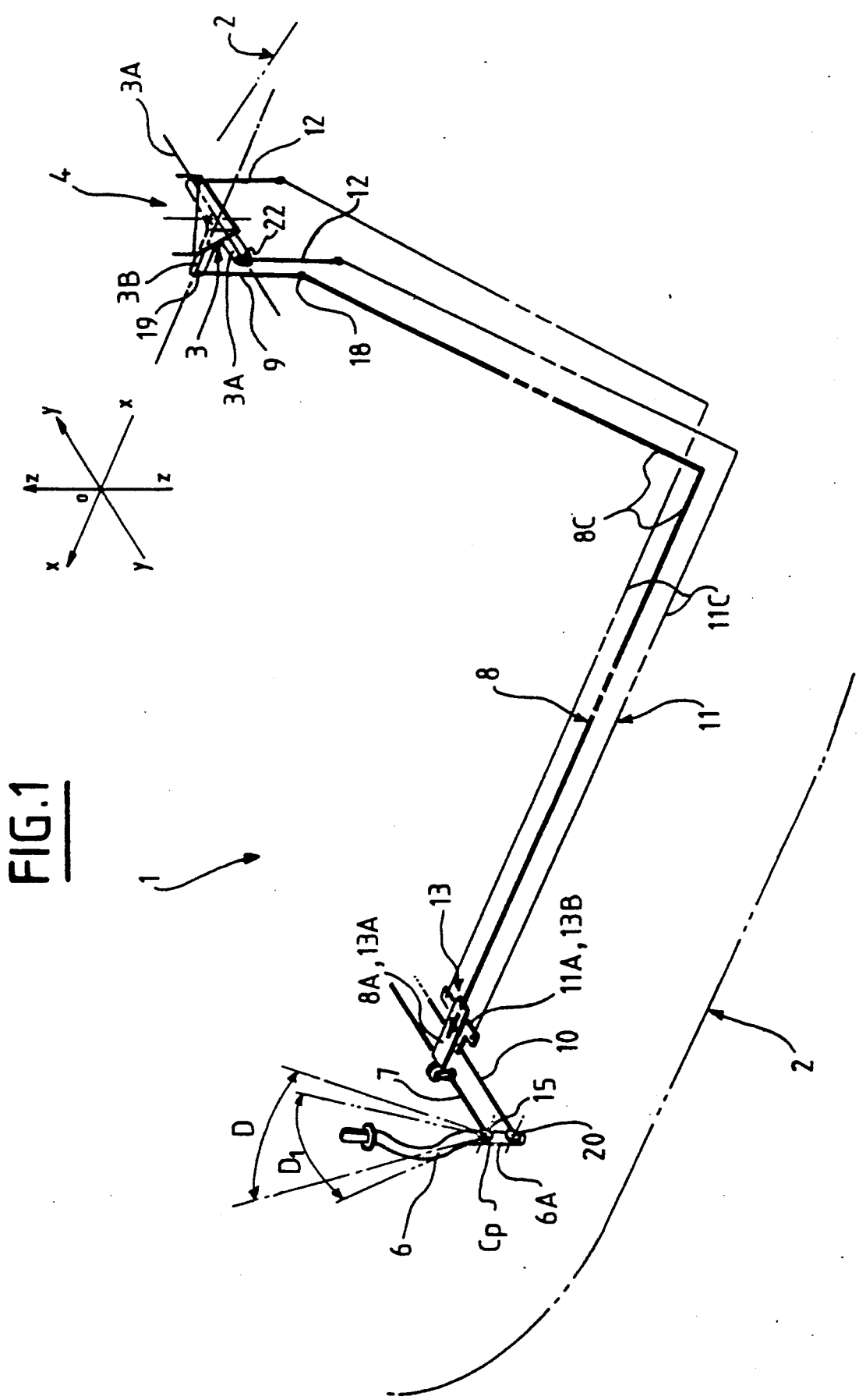
FIG. 1 is a diagrammatic view in perspective of the device according to the invention intended, in its preferred application, for the control of the cyclic plate of the rotor of a helicopter.

The device 1, represented in FIG. 1, is mounted, in its preferred application, on board a helicopter 2 in order to control the inclination of the cyclic plate 3 of the rotor 4 of the helicopter. Also, the two perpendicular axes of pivoting are represented, respectively 3A and 3B, around which the cyclic plate can be oriented under the action of the device 1. With respect to the orthonormal reference system Ox, Oy, Oz linked to the helicopter, the pivoting axis 3A of the cyclic plate is offset, with respect to the pitch axis Oy of the helicopter, by the angle necessary to compensate for the effect of gyroscopic precession, while the pivoting axis 3B of the plate is perpendicular to the pivoting axis 3A and offset with respect to the roll axis Ox by the same angular value as the axis 3A with respect to the pitch axis Oy.

Figure 2:
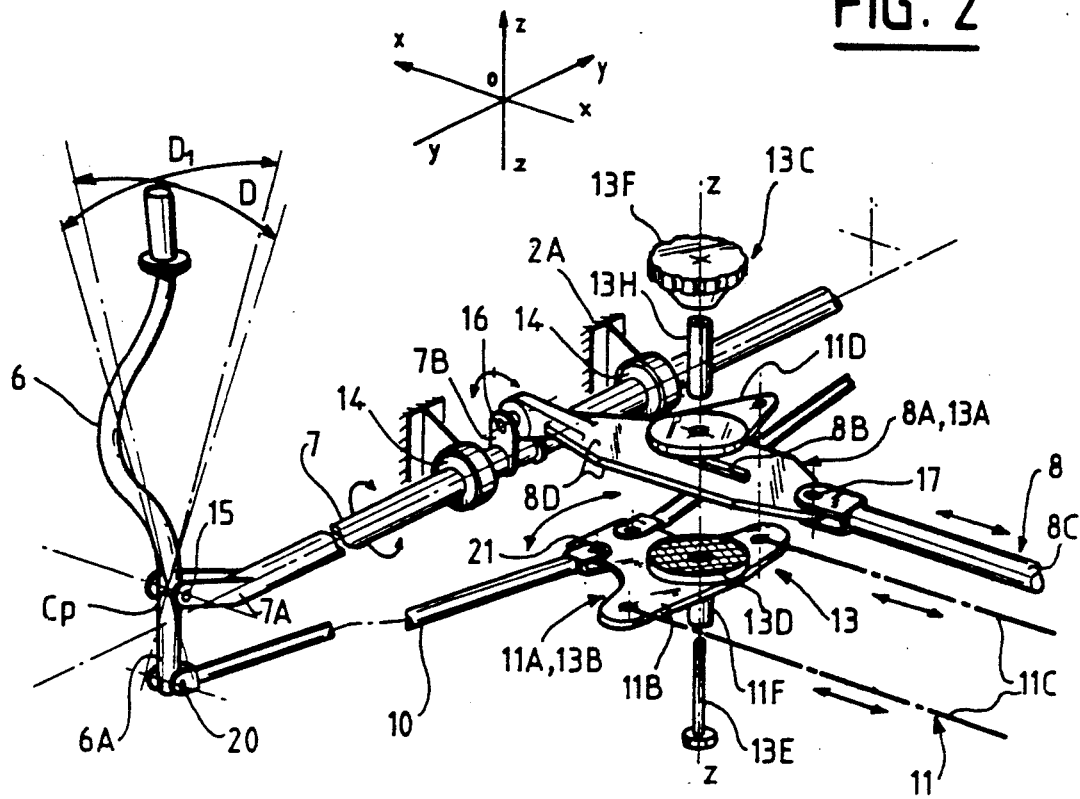
FIG. 2 illustrates, in diagrammatic perspective and partially exploded, the upstream part of the device according to the invention, especially showing a preferred example of embodiment of the friction means.

As FIGS. 1 and 2 show, the device 1 comprises a control column 6 or cyclic column, actuatable by the pilot. This cyclic column 6 is capable of being angularly displaced around a pivot center Cp on the one hand, in roll, in a plane x0z and, on the other hand, in pitch, in a plane y0z. Hence, in a known way, the angular displacement D of the cyclic column 6 in the longitudinal plane x0z is translated into the pivoting of the cyclic plate 3 around the axis 3A, offset with respect to the lateral axis Oy of the helicopter, and therefore into the tilting of the rotor disk towards the front or rear of the helicopter according to the direction of the displacement of the cyclic column 6, and the creation of a component of propulsion of the helicopter in the direction of the inclination of the rotor disk.

In a similar way, the angular displacement D1 of this latter in the lateral plane y0z is translated into the pivoting of the cyclic plate 6 around the axis 3B perpendicular to the axis 3A, and therefore into an inclination of the rotor disk, according to the direction of the displacement of the cyclic column 6, and into a lateral displacement of the helicopter in the direction of the inclination of the rotor disk, to the left or to the right.

In order to obtain the pivoting of the cyclic plate around these two axes 3A and 3B so as to steer the helicopter along the desired trajectory, the device 1 comprises, for the control of the pivoting around the axis 3A, a rotating shaft 7, a first link 8, and a displaceable member 9 connected to the plate 3, and, for the control of the pivoting around the axis 3B, a connecting rod 10, a second link 11, and two identical members 12 connected to the plate, respectively arranged on either side of the axis 3B. Also, so that the pivoting of the cyclic column by the pilot is effected in good conditions, the device 1 comprises friction means 13 permitting the pilot to apply the correct forces to the column, according to his wishes, and simultaneously filtering out the dynamic forces transmitted in return by the cyclic plate. By virtue of these means 13, the pilot does not feel the vibrations transmitted by the cyclic plate.

More particularly, the shaft 7 is arranged, in this embodiment, along the axis Oy of the reference system and it is carried, for example, by two ball bearings 14 linked to the structure 2A of the helicopter. The shaft 7 is articulated, at one of its ends 7A, to the cyclic column 6 via a journal 15 which is parallel to the axis Ox and the intersection of whose geometric axis with that of the column defines the pivot center Cp of said column.

Although it is not represented in the figures, a cyclic column, similar to that illustrated, could be provided at the other end of the shaft 7 for a co-pilot, for example for the in-flight flying instruction function.

The first link 8 advantageously comprises a slide 8A, formed by a flat part contained in the plane x0y and provided with an oblong hole 8B along the axis 0x. The slide 8A is articulated on the one hand at 16 to the shaft 7, by a crank pin which is offset parallel to the shaft 7 and carried by two flanges 7B provided on the shaft, and on the other hand at 17 to one end of a series of connecting rods and mechanisms 8C one end of which terminates, with respect to FIG. 1, via an articulation 18, in the control member 9. The latter is then connected via an appropriate articulation 19 to the periphery of the cyclic plate 3.

It can thus be understood that the angular displacement D of the cyclic plate 6 in the longitudinal plane x0z, around an axis parallel to the pitch axis, is translated into a rotation of the shaft 7, then into a displacement in translation of the first link 8, ending in a displacement of the maneuvering member 9 by virtue of which the cyclic plate 3 can pivot around the axis A, and cause the plane of the rotor disk to tilt forwards or rearwards according to the direction of pivoting of the column 6.

Moreover, the connecting rod 10 is articulated, around a ball joint 20, to the base 6A of the cyclic column and around an axis 21 to a swing bar 11A of the second link 11. This swing bar 11A comprises a plate 11B arranged parallel to the flat slide 8A, under the latter, and it is mounted rotatably around an axis z—z parallel to the axis 0z, as will be seen later. Also, the swing bar 11A is connected to a series of connecting rods and mechanisms 11C, which are not represented in detail and which transmit the rotating movement of the swing arm 11A to the members 12. The latter are articulated at 22 onto the periphery of the cyclic plate 3.

It can thus be understood that the angular displacement D1 of the column 6, around its pivot center Cp and in the lateral plane y0z, is translated into a translation of the connecting rod 10, which gives rise to the rotation of the swing bar 11A around its axis, which brings about, via the connecting rods and the mechanisms 11C, the pivoting of the cyclic plate 3 around its axis 3B, and the tilting of the rotor disk to the right or to the left of the helicopter, according to the direction of the displacement of the column 6.

It can be seen in FIGS. 1 and 2 that a part of the other connecting rod arranged symmetrically to the connecting rod 10 with respect to the plane x0z is intended to be connected to the base of the cyclic column of the co-pilot.

The friction means 13 of the device 1 are, according to the invention, advantageously arranged between the first and second links 8 and 11 and they comprise two friction elements 13A and 13B, associated respectively with the links 8 and 11, and adjustable clamping means 13C arranged perpendicular to these friction elements in order to press them against one another.

Figure 3:
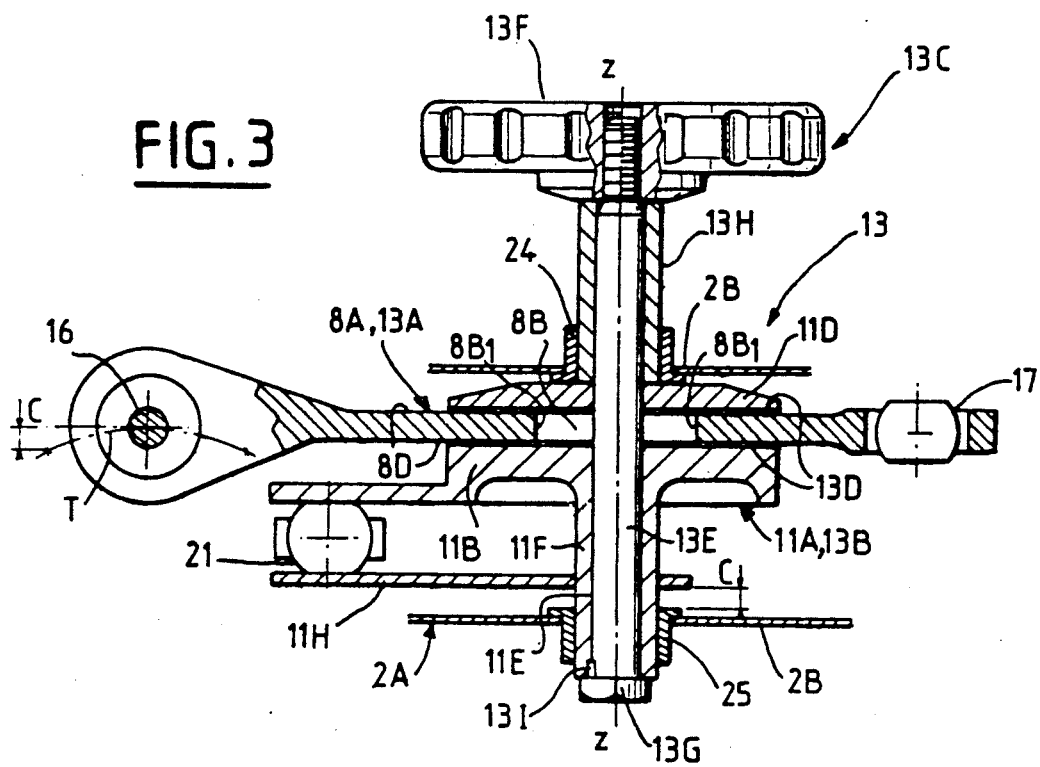
FIG. 3 is a longitudinal cross section of the upstream part of the device illustrated in FIG. 2 and representing the mounting of the friction means.

In the embodiment illustrated in FIGS. 2 and 3, the friction elements 13A and 13B correspond judiciously to the slide 8A of the first link 8 and to the swing bar 11A of the second link 11. More particularly, a flange 11D is applied fixedly and parallel to the plate 11D, in such a way that the swing bar 11A exhibits the shape of a clip or a stirrup. Also, the slide 8A is then engaged in the space provided between the plate 11B and the flange 11D of the swing bar 11A.

Advantageously, friction fittings 13D are then fixed to the plate 11B and to the flange 11D of the swing bar, and they are therefore applied directly against the corresponding faces 8D of the slide 8A. These friction fittings 13D exhibit the shape of disks, of the same dimension, arranged coaxially to the axis z—z. By way of example, they can be produced in polytetrafluoroethylene, while the opposed faces 8D of the slide are coated with a surface-hardened metal material, such as a light alloy covered with oxide.

By acting on the clamping means 13C, which will be described below, the pilot or the co-pilot adjusts the friction exerted by the fittings 13D, fixed to the flange and to the plate of the swing bar 11A, respectively against the opposed faces 8D of the slide 8A. Also, as the friction surfaces of the disks 13D of the swing bar 11A on the treated faces 8D of the slide 8A are symmetric and identical, and the pressure exerted is constant, the angular displacement of the cyclic column 6 in one of the planes creates no force in the other plane.

In this exemplary embodiment, the clamping means 13C of the friction means comprise a threaded stem 13E, passing through the swing bar and whose axis defines the pivoting axis z—z of the swing bar, and an adjustment knob 13F mounted on the threading of the stem 13E. More particularly, the stem passes through a piercing 11E provided in the plate 11B and in the flange 11D of the swing bar 11A, as well as the oblong longitudinal hole 8B of the slide 8A. The head 13G of the stem is applied against an axial extension 11F of the plate 11B and it is anchored in rotation onto this extension 11F by a stud 13I, while the adjustment knob 13F is applied, by the intermediary of a spacer 13H, against the flange 11D.

Hence it is seen that the friction means 13 are then close to the shaft 7 and to the connecting rod 10, and thus to the cyclic column 6, which means that the adjustment knob 13F is easily accessible both for the pilot and for the co-pilot.

Hence it is observed that by maneuvering only this knob 13F in rotation, the pilot raises or lowers, according to his wishes, the coefficient of friction of the friction fittings 13D, integral with the clip, on the treated faces 8D of the slide, and consequently the relative displacements between the two links 8 and 11 along the angular displacements D and D1 of the cyclic column. In fact, the swing bar 11A can pivot freely around the axis z—z with respect to the stem 13E, while rubbing against the slide 8A under the action of a translation of the connecting rod 10 following an angular displacement D1 of the column 6, the rotation of the swing bar bringing about, via the connecting rods and the mechanisms 11C and the members 12, tilting of the cyclic plate 3 around the axis 3B. Similarly, the slide 8A can be pulled or pushed longitudinally between the two end positions imposed by the circular edges 8B1 of the oblong hole, by rubbing against the fittings of the swing bar 11A, under the action of a rotation of the shaft 7 following an angular displacement D of the column 6. The slide 8 gives rise, via the connecting rods and the mechanisms 8C and the maneuvering member 9, to the corresponding tilting of the cyclic plate 3 around the axis 3A.

FIGS. 1 to 3 represent the cyclic column 6 in neutral position, that is to say that the cyclic plate 3 is in the plane x0y of the reference system linked to the helicopter. That being so, the position of the oblong hole 8B with respect to the stem 13E is such that the latter, linked to the structure of the helicopter, is in the middle of the oblong hole 8B.

The clamping means 13C providing the adjustment of the friction between the swing bar 11A and the slide 8A are associated with the structure 2A of the helicopter, while being able to slide, along the axis z—z, with respect to the structure, between two extreme high and low positions which are a function of the position occupied by the cyclic column 6 in its first plane of longitudinal displacement x0z.

For this purpose, referring to FIG. 3, the spacer 13H and the protruding axial extension 11F of the swing bar are mounted in bearings, respectively 24 and 25, coaxial with the axis z—z and fixed to elements 2B of the structure 2A. This mounting therefore allows the assembly constituted by the clamping means 13C, the slide 8A and the swing bar 11A, that is to say the friction means 13, to slide along this axis z—z between the two extreme positions, over a travel C.

Functionally, this sliding faculty of assembly is made necessary by the fact that the slide 8A is articulated to the rotating shaft 7 by the crank pin 16 which is offset parallel to the shaft. Consequently, as a function of the angular displacement D of the cyclic column in the first longitudinal plane x0z and of the rotation of the shaft 7 which ensues, the crank pin 16 describes a circular trajectory T which brings about, with respect to the high point (FIGS. 2 and 3) which it occupies when the cyclic column 6 is in neutral position, the displacement forwards or rearwards of the slide 8A, by virtue of the presence of the oblong hole 8B, and, simultaneously, the lowering of the assembly from its high position towards its low position, sliding in the bearings 24, 25.

Consequently, when the column 6 is in neutral position, the swing bar 11A is applied by the flange 11D against the bearing 24, the maximum travel C then lying between a small plate 11H, integral and parallel with the plate 11B of the swing bar, and the bearing 25. The assembly occupies the high position.

In contrast, when the column 6 is angularly displaced at D, for example forwards, the crank pin 16 describes a circular trajectory T drawing the slide 8A until the rear circular edge 8B1 of the oblong hole 8B comes into contact with the stem 13E and, concomitantly, the assembly slides towards the low position, not represented, in which the small plate 11H of the swing bar 11A is supported against the bearing 25. The crank pin then occupies a low point, the distance separating the high point from the low point corresponding to the travel C.

During these combined angular displacements D and D1 of the cyclic column 6 by the pilot, which are translated into pivotings of the cyclic plate around the axes 3A and 3B, measurement of the forces at the column on the device has shown that, by virtue of these single friction means, the resultant of the resisting forces was substantially applied to the handle of the control column in the direction of displacement of the latter.

Moreover, as the device 1, with the exception of the cyclic column 6 and of the adjustment knob 13F of the friction means, is situated below the floor of the helicopter, its protection with respect to dirt and other dust is a maximum.

It should also be noted that the adjustment of the friction between the two kinematic chains or the two links can be produced automatically by means of a motor member, associated with the clamping knob 13F and not shown. The pilot may also, from a specific control knob provided on the handle of the column, instantaneously adjust the friction between the swing bar and the slide, and adapt it to the optimum value on the basis of the phase of flight being undertaken.

Moreover, the force to be provided by the pilot in the first longitudinal plane and the force to be provided in the second lateral plane can easily be adjusted in order to obtain an appropriate ergonomic ratio. In order to do this, it is possible to modify, for example, the lever arm between the articulations connecting the column to the shaft and that connecting the slide to the shaft, or even the diameter of the friction disks.

I claim:

1. A device for the adjustment of the maneuver forces of movable members of an aircraft comprising:
   at least one pivoting control column;
   a shaft articulated to said column and able to pivot around its axis under the action of an angular displacement of the column in a first plane;
   a first link provided between said shaft and at least one first movable member, and giving rise to the displacement of said first movable member;
   a connecting rod articulated to said column and able to be displaced in translation parallel to its longitudinal axis under the action of an angular displacement of the column in a second plane;
   a second link provided between said connecting rod and at least one second movable member, and giving rise to the displacement of said second movable member; and
   friction means in order to apply the correct angular displacements to the column int he two planes and provide adjustable braking of the angular displacements of the column under the forces coming from the first and second movable members, wherein said friction means are arranged between said first and second links and comprise at least two friction elements, associated respectively with the first and second links, and adjustable clamping means applying the two friction elements against one another.

2. The device as claimed in claim 1, wherein said friction elements associated respectively with the first and second links are close to said shaft and to said connecting rod to which the pivoting column is articulated.

3. The device as claimed in claim 1, wherein one of the friction elements is provided with a friction fitting while the other friction element is coated with a material having a high surface hardness, the clamping means allowing the adjustment of the pressure between said fitting and said material.

4. The device as claimed in claim 3, wherein said friction fitting is produced in polytetrafluoroethylene and exhibits the shape of a disk applied to said element.

5. The device as claimed in claim 3, wherein said material coating the corresponding friction elements is produced in a metal material, said metal material being a light alloy with hard anode oxidation.

6. The device as claimed in claim 1, wherein one of the friction elements exhibits the shape of a clip, into which is engaged the other friction element.

7. The device as claimed in claim 1, wherein said clamping means comprise a threaded stem, passing perpendicularly through the friction elements associated with the first and second links, and a clamping knob mounted on the stem and allowing the adjustment of the fiction between said elements.

8. The device as claimed in claim 1, in which, with respect to the roll 0x, pitch 0y and yaw 0z axes of said aircraft;
- said column can pivot, around a pivot center, in a first longitudinal plane x0z and in a second lateral plane y0z;
- said rotating shaft is arranged along the axis 0y;
- the first link comprises a bar articulated onto said rotating shaft parallel to said rotating shaft and able, under the action of an angular displacement of the column in said first pane, to be displaced longitudinally; and
- the second link comprises a swing bar articulated to said connection rod and able, under the action of the angular displacement of the column in said second plane, to pivot in its plane around an axis z—z which is parallel to the axis 0z, wherein a slide in provides on the first link between said shaft and said bar and wherein said friction elements correspond respectively to said slide and said swing bar of said first and second links, said clamping means passing perpendicularly along the axis z—z through said slide and said swing bar while pressing them against one another.

9. The device as claimed in claim 8, wherein said stem of said clamping means is engaged in a piercing provided in said swing bar and in an oblong hole provided longitudinally in said slide.

10. The device as claimed in claim 8, wherein said swing bar exhibits a clip shape, between the opposed faces of which is arranged said slide.

11. The device as claimed in claim 8, wherein said clamping means, associating the slide and the swing bar with one another, are mounted slidably along the axis z—z in bearings linked to the structure of said aircraft, the assembly formed by the friction means and constituted by the clamping means, the swing ar and the slide being capable of sliding axially between a high position, in which the column is in a neutral position at least in the first plane x0z, and a low position in which the angular displacement of the column in said first plane is maximum.

* * * * *